United States Patent [19]

Anderson

[11] Patent Number: 4,964,712
[45] Date of Patent: Oct. 23, 1990

[54] WIDE-VIEW HORIZONTAL VEHICLE SAFETY MIRROR

[76] Inventor: Allen J. Anderson, 21220 Harrow Ave., N., Forest Lake, Minn. 55025

[21] Appl. No.: 357,052

[22] Filed: May 25, 1989

Related U.S. Application Data

[63] Continuation-in-part of Ser. No. 200,547, May 31, 1988, abandoned.

[51] Int. Cl.⁵ .......................... G02B 7/18; G02B 23/08
[52] U.S. Cl. ...................... 350/618; 350/540; 350/543; 350/544
[58] Field of Search ............... 350/538, 539, 540, 541, 350/542, 543, 544, 618, 622, 623, 626

[56] References Cited

U.S. PATENT DOCUMENTS

| | | | |
|---|---|---|---|
| 1,635,011 | 7/1927 | Sadler | 350/544 |
| 1,710,040 | 4/1929 | Boysen | 350/618 |
| 3,972,596 | 8/1976 | Baumgardner et al. | 350/452 |
| 4,120,566 | 10/1978 | Sancj et al. | 350/622 |
| 4,787,725 | 11/1988 | Preussner et al. | 350/541 |
| 4,826,304 | 5/1989 | Guch, Jr. et al. | 350/540 |

FOREIGN PATENT DOCUMENTS

| | | | |
|---|---|---|---|
| 2700441 | 7/1978 | Fed. Rep. of Germany | 350/618 |
| 0645340 | 10/1928 | France | 350/543 |
| 0274912 | 1/1929 | United Kingdom | 350/543 |

*Primary Examiner*—Bruce Y. Arnold
*Assistant Examiner*—R. D. Shafer
*Attorney, Agent, or Firm*—Larence M. Nawrocki

[57] ABSTRACT

A device for enabling the driver of a vehicle to view behind the vehicle as he is driving. The apparatus includes a number of elongated periscopes mounted generally vertical within the vehicle. The periscopes are mounted so as to provide adjacent angular fields about a generally vertically-oriented axis. The device further includes a plurality of sleeves, each sleeve receiving a corresponding periscope for axial movement for relative thereto. The sleeves are mounted for movement about a generally horizontal axis. Each sleeve includes a pawl member which projects axially from its corresponding sleeve. The apparatus is, further, constructed so that when a main body portion of a periscope is moved telescopically within its corresponding sleeve to bring that sleeve into engagement with a collar carried by a head portion of the periscope, the pawl member will enter one of a plurality of circumferentially-spaced notches formed in the collar to enable rotation of the main body portion of the periscope tube about the axis of elongation thereof.

4 Claims, 4 Drawing Sheets

WIDE-VIEW HORIZONTAL VEHICLE SAFETY MIRROR

CROSS-REFERENCE TO RELATED U.S. APPLICATION

This document is a continuation-in-part of co-pending U.S. patent application Ser. No. 200,547 filed May 31, 1988, now abandon.

TECHNICAL FIELD

The invention of this document deals broadly with automotive technologies. More specifically, however, the invention deals with apparatus employed by the driver of a vehicle in order to ascertain what is approaching behind his vehicle. It is directed to a rear-viewing apparatus that can be employed in automobiles, trucks or virtually any other type of vehicle.

BACKGROUND OF THE INVENTION

The development of the automobile spurned by the invention of the internal combustion engine has come to a point far beyond what was envisioned early in the twentieth century. Automobiles, station wagons, and personal trucks have come to be regarded as a necessity rather than a luxury item. Millions of such vehicles are in use on roads throughout the world, and manufacturers of these vehicles are coming into being in ever increasing numbers.

As the automobile and related vehicles have developed, fixtures and options employed therein have become more numerous and sophisticated. The nature of these fixtures can vary significantly. For example, radios and cassette tape decks are now offered by virtually every automobile and truck manufacturer in the business.

The inclusion of other fixtures has been generated by ecological and safety considerations. Because of the large number of vehicles operating on the road systems of the world, many countries and subdivisions thereof have enacted legislation requiring the employment of, for example, catalytic converters. Such devices function to render the vehicles in which they are employed less environmentally damaging.

As previously indicated, safety is also a significant motivating factor. For many years now, automobile manufacturers have strived to afford the driver of a vehicle with maximum visibility. This is true with regard to front visibility, rear visibility and side visibility.

The ability to see in all directions has been maximized in a number of manners. For example, body design has been refined so that posts do not obstruct the driver's view, particularly at critical locations. It is understood, of course, that the roof of the vehicle must be supported in some manner. Manufacturers do, however, seek to minimize the degree of obstruction of view.

Another manner in which visibility is sought to be maximized is by providing a vehicle with fixtures for enabling rear and side viewing, whereby the driver need not pivot his neck or body in the direction in which viewing is sought. Typically, such devices take the form of rear and side view mirrors.

External side view mirrors are significant aids in enabling a driver to maximize his viewing range. Such devices, being external to the vehicle, are not affected by obstructions which affect the driver's vision inside the vehicle. For example, rear view mirrors mounted proximate the vehicle windshield are, typically, subject to the same obstructions as would be the driver looking directly in an intended direction of viewing.

As can be seen, internal rear view mirrors, while certainly serving a function, do have limitations. In addition to being susceptible to visual obstruction, they also are limited in that they typically provide a relatively narrow angular range of view. This limitation also applies to conventional, external side mirrors.

It is to these limitations and advantageous dictates of the prior art that the present invention is directed. It is apparatus which include a periscope arrangement. In view of the structure employed, internal obstructions to viewing are eliminated, and a wide range viewing angle is afforded.

SUMMARY OF THE INVENTION

The present invention is a device which affords adequate rear viewing which is unobstructed by internal obstacles and which enables the driver to see through a wide angle range of viewing. It includes a plurality of elongated periscope-like structures. Each periscope structure has an outer end and an inner end, a periscope being mounted with its outer end outside of a wall of a vehicle with which the device is to be used, and an inner end inside of the wall. The periscope itself passes through an opening in the wall. Each periscope provides an angular field of view. Two adjacent periscopes are oriented relative to one another so that their fields of view overlap about an axis generally perpendicular to the wall through which the periscopes pass. An expanded field of view is, thereby, provided. The expanded field of view is, by definition, greater than that provided by each individual periscope.

It is envisioned that a preferred embodiment of the invention would include three periscopes. A center-line periscope would be oriented so that approximately half of its field of view would be on either side of the center-line of the vehicle. It is anticipated that at least one lateral periscope would be positioned on either side of the center-line periscope. The lateral periscopes would be oriented so that their fields of view would overlap with that of the center-line periscope. It is intended that the expanded field of view encompass all 180 degrees between 90 degrees and 270 degrees relative to the center-line axis of the vehicle.

In the preferred embodiment, a plurality of mounting sleeves are provided. Each sleeve is intended to receive therein a corresponding one of the periscope structures. Each periscope is disposed for relative telescoping movement within its corresponding sleeve so that the periscope can be extended, as necessary, in view of circumstances, in order to ensure that view is unobstructed. The sleeves are, in turn, it is intended, pivotally mounted for movement about a generally horizontal axis extending substantially transversely to an intended direction of movement of the vehicle. The periscopes received within the sleeves can, thereby, be pivoted in a pitching fashion. Again, obstruction of view can be avoided.

It would, of course, be desirable that, during operation of the vehicle, the telescope structures be held in a particular orientation rather than be allowed to move freely. Consequently, means can be provided for locking the periscope tubes against the relative telescoping movement thereof with respect to their corresponding sleeves, and for locking the sleeves against the afforded pivotal movement.

In the preferred structure, each sleeve is provided with an axially projecting pawl member. In turn, the corresponding periscopes are structured having a main body portion actually received within the corresponding sleeve, and a head portion which is disposed for rotation, relative to an axis of elongation of the periscope tube, relative to the main body portion thereof. A collar is carried by the head portion, and the collar is provided with a plurality of circumferentially-spaced notches. The notches face axially in a direction opposite that in which the pawl member projects. Positioning is such that, when the main body portion of the periscope is moved telescopically within the corresponding sleeve to bring the sleeve into engagement with the collar, the pawl member will enter one of the notches. Consequently, with the pawl member received within one of the notches, rotation of the main body portion of the periscope tube about the axis of elongation thereof will effect angular displacement of the corresponding head portion relative to the main body portion. The particular direction in which the angular field of view is aimed can, thereby, be varied.

The present invention is thus an improved rear viewing apparatus for use in various types of vehicles. More specific features and advantages obtained in view of those features will become apparent with reference to the Detailed Description of the Invention, appended claims and accompanying drawing figures.

DETAILED DESCRIPTION OF THE INVENTION

Figure 1:
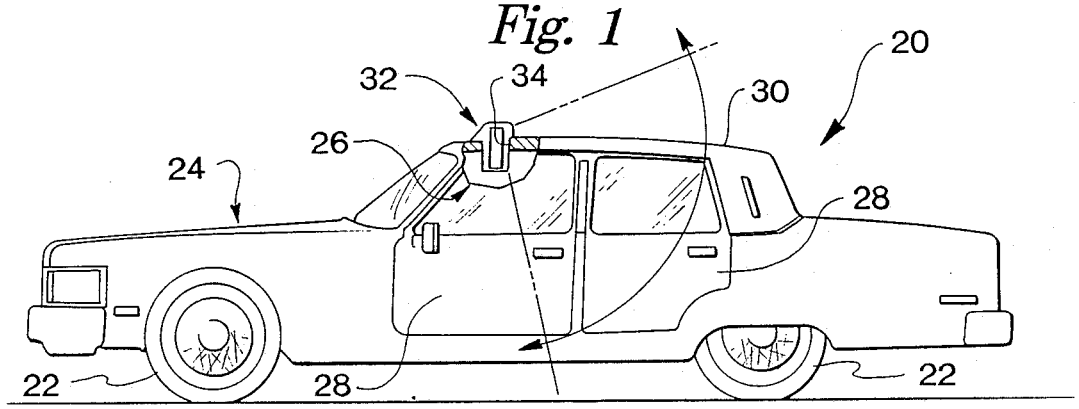
FIG. 1 is a left side elevational view of an automobile having the present invention installed therein.
Figure 2:
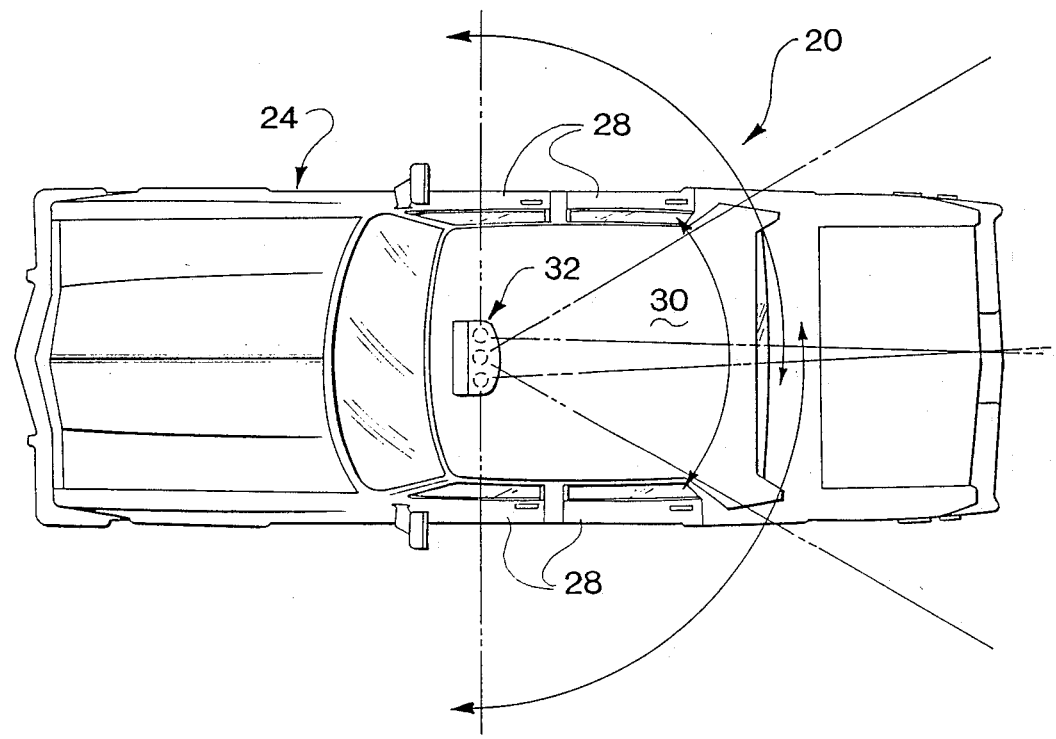
FIG. 2 is a top plan view of the automobile of FIG. 1.
Figure 3:
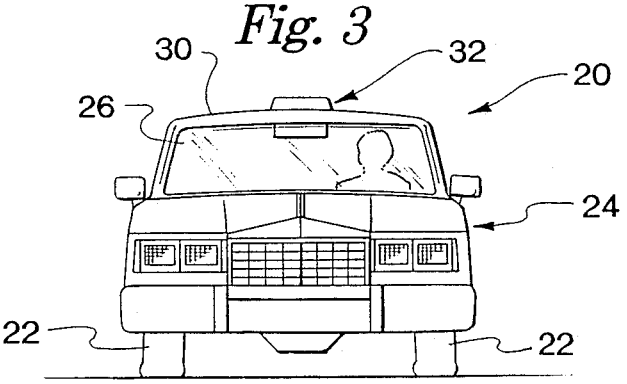
FIG. 3 is a front elevational view of the automobile of FIG. 1.

Referring now to the drawings wherein like reference numerals denote like elements throughout the several views, FIGS. 1-3 illustrate an automobile 20 in which the present invention can be used. Such a vehicle 20 is of typical construction having a plurality of wheels 22 mounting a chassis (not shown), which supports a body 24 having a passenger compartment 26.

The passenger compartment 26 is provided with a plurality of doors 28 which afford entrance to, and egress ; from, the interior of the compartment 26. The doors 28, along with other portions of the body 24, including an upper closure wall (or roof) 30, define the passenger compartment 26.

Figure 4:
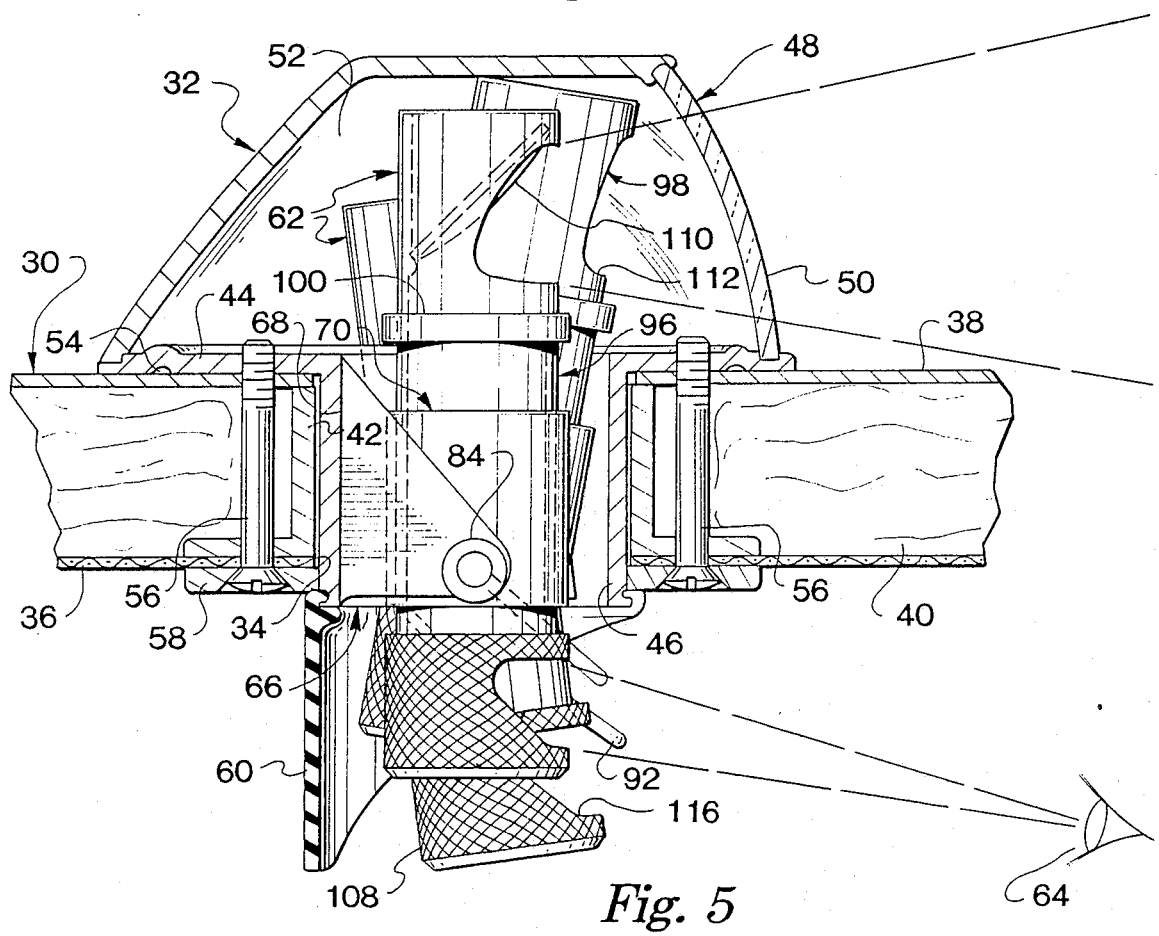
FIG. 4 is an enlarged fragementary view of the present invention shown in general section.
Figure 5:
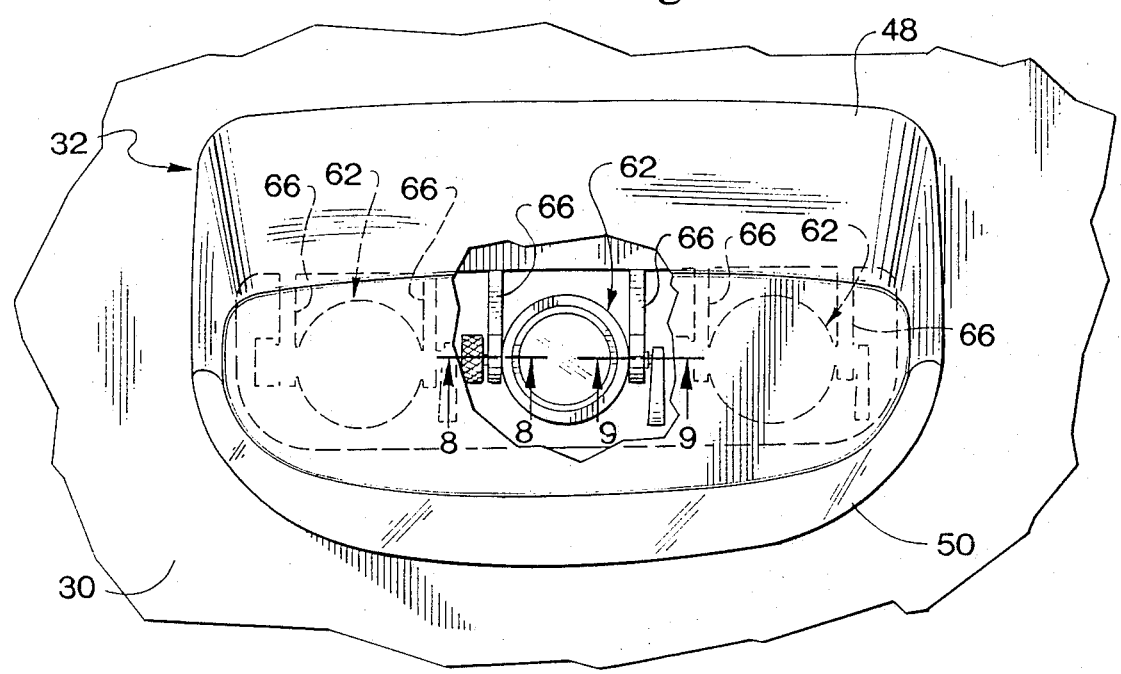
FIG. 5 is a top plan view of the invention of FIG. 4 with some parts thereof being cut away.

The present invention is a fixture 32 mounted in the roof 30 of the vehicle 20. As best seen in FIGS. 4 and 5, the fixture 32 is received within an aperture 34 formed in the roof 30. Typically, the roof 30 of a vehicle 20 such as an automobile includes inner and outer panels 36, 38 having insulative batting 40 therebetween. A spacer 42 would, it is envisioned, be inserted between the inner and outer panels 36, 38 to better define the aperture 34 in which the fixture 32 is to be received.

The fixture 32 is shown as comprising a base 44 which is seated on the outer panel 38 of the roof 30. A well 46, closely conforming to the aperture 34 in the roof 30, extends downwardly from the base 44. The base 44 carries a cowl 48 which, when the fixture 32 is seated in the aperture 34 in the roof 30, extends upwardly from the roof 30. The cowl 48 has a transparent window 50 formed therein on a side thereof facing rearwardly, and an enclosure 52 is defined within the cowl 48. In order to seal the fixture 32 against the roof 30, sealing means such as an O-ring 54 could be received within an annular recess in the lower surface of the base 44. The fixture 32, it is envisioned, would be secured to the roof 30 of the vehicle 20 by means of a series of bolts 56 passing through an escutcheon plate 58 brought into engagement with the inner panel 36 of the roof 30, the inner and outer panels 36, 38 defining the roof 30, and the base 44 of the fixture 32. Two of such bolts 56 are shown in FIG. 4.

If desired, a shield 60 could be affixed to the fixture 32 so that is would depend from the lower end of the well 46. Such a shield 60 would, typically, be made of a hard, rubber-like material and would serve to protect the lower ends of a plurality of periscopes 62, as will be described hereinafter.

As seen in FIGS. 4 and 5, a plurality of periscopes 62 are mounted within the fixture 32, upper ends of the periscopes extending up into the enclosure 52 defined within the cowl 48, and lower ends extending below the well 46 so as to be viewable by the eye 64 of the driver of the vehicle 20. Intermediate portions of the periscopes 62 pass through the well 46 and are mounted therewithin by appropriate means.

As best seen in FIG. 5, a pair of suspension brackets 66 are used to mount each periscope 62. FIG. 5 shows three periscopes 62 as being employed in the invention. Six brackets 66 are, therefore, illustrated in mounting those periscopes 62.

One of these brackets 66 is shown in side elevation in FIG. 4. Although certainly not essential to the invention, the bracket 66 is shown as being generally triangular in shape, one leg 68 of the triangle being welded or secured by other appropriate means to a forward portion of the well 46. A corresponding bracket 66 is similarly attached at a distance from the illustrated bracket substantially the same as the diameter of a sleeve 70 in which a periscope tube is telescopically received. The sleeve 70 can be provided with trunions 72, 74, one extending radially from each of opposite sides of the sleeve 70. Such trunions 72, 74 are best seen in FIGS. 8 and 9.

Figure 9:
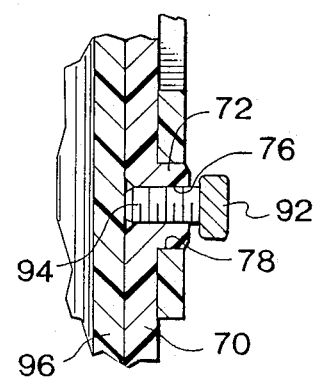
FIG. 9 is an enlarged sectional view taken generally along the line 9—9 in FIG. 5.

FIG. 9 illustrates a trunion 72 which has a central, threaded aperture 76 formed therethrough. The purpose of this aperture 76 will be discussed hereinafter. In any case, however, that trunion 72 is received in an aperture 78 in one of the associated suspension brackets 66. The trunion 72 is sized, with respect to the aperture 78 in the bracket 66, so that the sleeve 70 may pivot freely with respect to the bracket 66.

Figure 8:
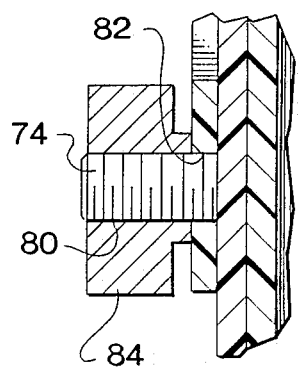
FIG. 8 is an enlarged sectional view taken generally along the line 8—8 in FIG. 5.

FIG. 8 illustrates the opposite trunion 74 as being threaded as at 80. The threaded trunion 74 passes through an aperture 82 in the second suspension bracket 66 and, together with the trunion 72 previously discussed, provides a shaft for pivotable mounting of the sleeve 70 between the brackets 66.

As shown in FIG. 8, the threaded trunion 74 has a locking knob 84 received thereon. This knob 84, when tightened down, locks the particular periscope 62 into a particular angle of pitch.

Figure 8A:
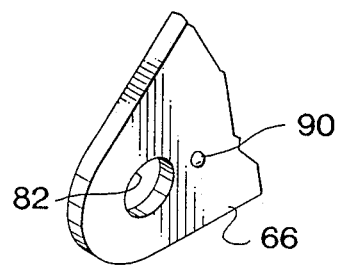
FIG. 8a is a fragmentary perspective detailed view of a suspension bracket.
Figure 8B:
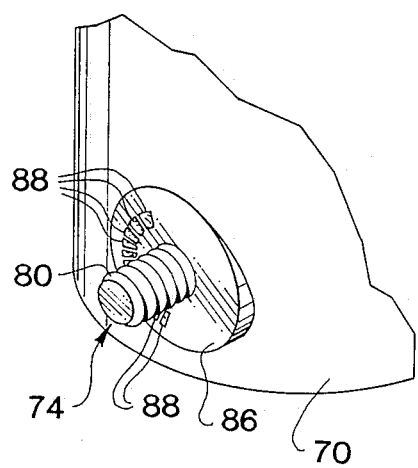
FIG. 8b is a fragmentary persective detailed view of a threaded trunion by which a periscope is mounted to the suspension bracket.

Referring now to 8a and 8b, it is seen, in FIG. 8b, that the side of the sleeve 70 is provided with a land 86. The threaded trunion 74 extends centrally from this land 86. The land 86 has a plurality of detent pits 88 defining an arc in the land 86. These pits 88 are formed at a substantially uniform distance from the trunion 74.

FIG. 8a illustrates a suspension bracket 66 having a bead detent 90 formed therein. The bead detent 90 is provided at a location on the suspension bracket 66 at a distance from the aperture 82 therein through which the threaded trunion 74 passes so that the bead detent 90 can be received in the various detent pits 88. The pits 88, thereby, define various locations at which the bead detent 90 can be locked by tightening down of the locking knob 84 to establish, thereby, various angles of inclination.

As previously indicated, the trunion 72 illustrated in FIG. 9 has an aperture 76 formed centrally therethrough. A locking lever 92 having a threaded set screw-type stud 94 entering the aperture 76 is employed for locking the tubular body 96 of the periscope 62 in a desired relative axial position with respect to the sleeve 70. The lever 92 can be rotated so that the threaded stud 94 comes into tight engagement with the tubular body 96 of the periscope 62. As sufficiently tight engagement is achieved, relative axially movement will be precluded.

Figure 6:
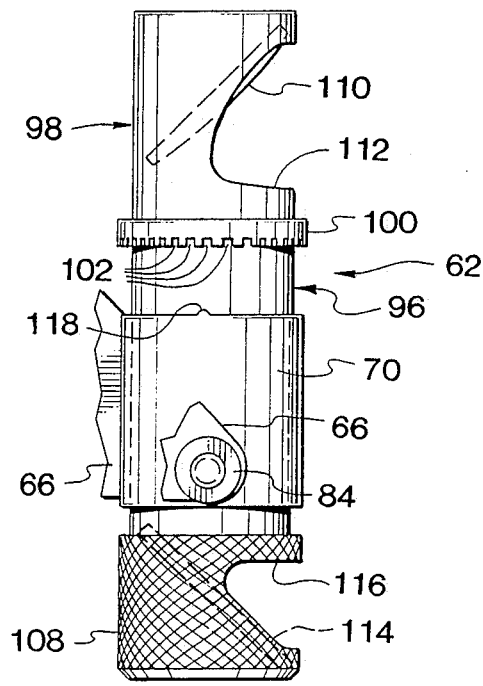
FIG. 6 is a fragmentary side elevational detailed view of one periscope in accordance with the present invention.
Figure 7:
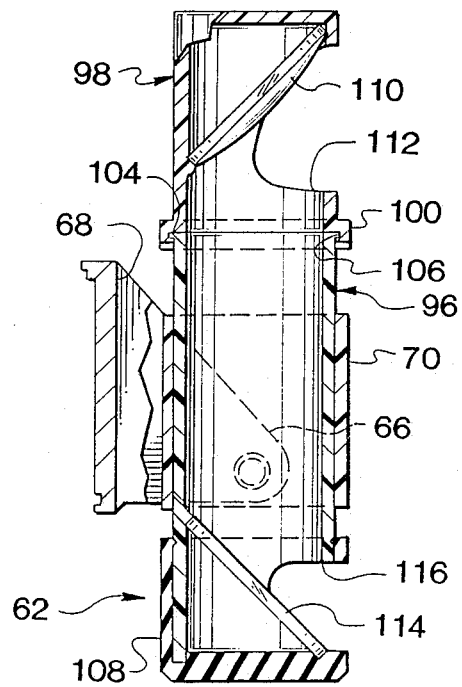
FIG. 7 is a view similar to that of FIG. 6, some parts being cut away.

FIGS. 6 and 7 best illustrate the structure of a periscope 62. The periscope 62 includes a main body portion 96 which slides within the sleeve 70. A head portion 98 defines the outer end of the periscope 62. As seen in FIG. 6, a lower edge of the head portion carries a collar 100 which is rigidly attached thereto. The collar 100 has a plurality of notches 102 formed in an underside thereof.

As seen in FIG. 7, the head portion 98 and main body portion 96 of the periscope 62, while press fit relatively tightly, can be rotated relative to one another about the axis of the elongation of the periscope 62. A lip 104 at the upper end of the main body portion 96 is fitted into an annular slot 106 internal to the head portion 98 to secure the two portions 96, 98 together.

A lower end of the main body portion 96 of the periscope 62 is provided with a grasping knob 108 for facilitating positioning of the periscope 62. For this reason, therefore, the knob 108 can be knurled or provided with a textured surface.

As seen in FIGS. 4, 6, and 7, each periscope 62 is provided with an obliquely mounted mirror at both its upper and lower ends. The upper mirror 110 is mounted in the head portion 98 and a window 112 is formed in the head portion 98 so that the image of objects behind the vehicle 20 can be formed on that mirror 110. That image is, in turn, reflected to the lower mirror 114 mounted obliquely within the lower end of the periscope 62. Again, a window 116 is provided so that the image reflected from the lower mirror 114 can be seen by the driver of the vehicle 20.

It will be understood that the optics specifically described to this point are not the only ones which can be employed. In fact, it is contemplated that an inverting lens might be employed in order to ensure that the image seen by the driver is right-side-up. Such a lens is not shown in the Figures.

Basically three manipulations are worked upon the periscope 62 by the driver of the vehicle 20. These include a vertical adjustment of the periscope 62 by sliding the main body portion 96 thereof within the sleeve 70, a variation of the pitch angle of the periscope 62, and a lateral variation of the angular field of view provided by a periscope 62.

The first adjustment is accomplished by rotating the locking lever 92 mounted proximate the trunion 72 illustrated in FIG. 9. Rotation of the lever 92, in turn, effects a withdrawal of the set screw 94. As the withdrawal is accomplished, the tubular main body portion 96 of the periscope 62 can be slid freely within the sleeve 70. When a particular relationship between the tube 96 and the sleeve 70 is achieved, the lever 92 can, again, be pivoted to tighten down the set screw 94 to lock the tube 96 and sleeve 70 into a particular relative axial relationship.

The second adjustment is accomplished by loosening the locking knob 84 threaded onto the threaded trunion 74. Loosening will allow the sleeve 70 to swing freely relative to the suspension brackets 66, and the angle of pitch can be adjusted. Once a desired angle is achieved, the locking knob 84 is again tightened down.

The third adjustment is accomplished in conjunction with the selection of the telescoping position of the periscope 62 relative to the sleeve 70. While the set screw 94 is withdrawn, the periscope 62 can be drawn as low as possible so that the collar 100 of the head portion 98 engages the upper edge of the sleeve 70. As previously discussed, a lower edge of the collar 100 is provided with a plurality of notches 102. The upper edge of the sleeve 70 is provide with a pawl member 118 which, when engagement is accomplished, will be received within one of these notches 102. In order to adjust the lateral aiming of the upper mirror 110, the knob 108 at the bottom end of the periscope 62 can be turned to rotate the main body portion 96 of the periscope 62 about the longitudinal axis thereof. While the head portion 98 would normally rotate along with the main body portion 96, when the pawl 118 carried by the sleeve 70 is engaged in one of the notches 102, rotation of the head portion 98 will be precluded.

As can be seen then, in view of this disclosure, if it is desired to aim the periscope 62 so that its angular field of view is rotated farther to the left, the turning knob 108 would be rotated to the right. Once the angular adjustment were achieved, the driver of the vehicle 20 would urge the periscope 62 upwardly to release the pawl 118 from the notch 102, rotate the tube by turning the knob 108 to the left so that the lower mirror 114 were viewable, adjust the axial position of the tube within the sleeve 70, and tighten down the set screw 94 to maintain the desired axial positioning.

Figure 10:
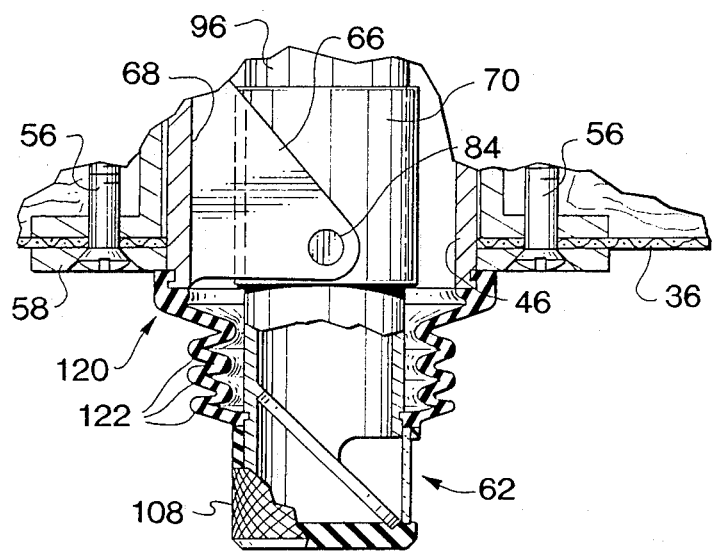
FIG. 10 is a fragmentary side elevational view, similar to the lower portion of FIG. 4, illustrating an alternative embodiment.

FIG. 10 illustrates an alternative embodiment of the invention. That embodiment employs a sealed fixture. This is accomplished by utilizing a flexible boot 120. The boot 120 has a plurality of accordian-like folds 122 which enable manipulation of the periscope 62. An upper end of the boot 120 is secured at the lower end of the well 46. A lower end of the boot 120 is secured proximate the grasping knob 108. It will be understood that, in this embodiment, the maintaining of angles of pitch, relative axial positioning of the periscope 62 relative to the sleeve 70, etc. would be accomplished by tight press fittings, since locking knobs and locking levers would not be accessible.

Numerous characteristics and advantages of the invention have been set forth in the foregoing description. It will be understood, of course, that this disclosure is, in many respects, only illustrative. Changes can be made in details, particularly in matters of shape, size, and arrangement of parts without exceeding the scope of the invention. The invention's scope is defined in the language in which the appended claims are expressed.

What is claimed is:

1. Vehicle rear-viewing apparatus, comprising:
    (a) a plurality of elongated periscopes, each of said periscopes having an outer end and an inner end, and providing an angular field of view, each periscope including a tube mounting optics therein;
    (b) a plurality of sleeves, each sleeve receiving a corresponding periscope therewithin for relative telescoping movement, to mount said periscope received therewithin with its inner end inside a wall of a vehicle with which the periscope is used, and its outer end outside said wall, wherein angular fields of view of two adjacent periscopes overlap about a first axis generally perpendicular to said wall to afford an expanded field of view about the first axis greater than that provided by each individual periscope;
    (c) means mounting each sleeve for pivotal movement about a second axis generally perpendicular to the first axis;
    (d) a pawl member projecting axially from each sleeve; and
    (e) wherein each periscope tube comprises a main body portion received within its corresponding sleeve for relative telescoping movement, a head portion defining said outer end of the periscope tube, said head portion being disposed for rotation, with respect to an axis of elongation of the periscope tube, relative to said main body portion, and a collar carried by said head portion, said collar including a plurality of circumferentially-spaced notches formed therein, wherein, when said main body portion is moved telescopically within said sleeve to bring said sleeve into engagement with said collar, said pawl member will enter one of said notches, and rotation of said main body portion of the periscope tube about the axis of elongation will effect angular displacement of said head portion relative to said main body portion.

2. Apparatus in accordance with claim 8 comprising a center-line periscope and a pair of periscopes straddling said center-line periscope, and wherein said periscopes combine to afford an expanded field of view about the first axis of at least 180 degrees.

3. Apparatus in accordance with claim 1 further comprising means for locking a periscope tube against relative telescoping movement with respect to its corresponding sleeve.

4. Apparatus in accordance with claim 1 further comprising means for locking a sleeve against pivotal movement about the second axis.